United States Patent [19]

Engle

[11] Patent Number: 5,067,872
[45] Date of Patent: Nov. 26, 1991

[54] METHOD FOR SEMITRAILER TRANSFER

[75] Inventor: Thomas H. Engle, Cape Vincent, N.Y.

[73] Assignee: Knorr Brake Holding Corporation, Rockville, Md.

[21] Appl. No.: 565,397

[22] Filed: Aug. 10, 1990

Related U.S. Application Data

[60] Division of Ser. No. 195,453, May 24, 1988, Pat. No. 4,973,206, which is a continuation of Ser. No. 64,142, Jun. 18, 1987, abandoned.

[51] Int. Cl.[5] .............................................. B65G 67/00
[52] U.S. Cl. ....................................... 414/786; 410/67
[58] Field of Search ............... 414/333, 334, 339, 340, 414/341, 345, 347, 426, 430, 495, 572, 573, 786; 410/67; 104/29, 27

[56] References Cited

U.S. PATENT DOCUMENTS

| | | |
|---|---|---|
| 2,836,129 | 5/1958 | Jaeger . |
| 2,884,870 | 5/1959 | Day . |
| 2,903,977 | 9/1959 | Ulinski . |
| 2,928,684 | 3/1960 | Geiger . |
| 3,200,977 | 8/1965 | Thouvenelk et al. . |
| 3,202,390 | 8/1965 | Sherrie et al. . |
| 3,236,194 | 2/1966 | Vivian . |
| 3,370,666 | 2/1968 | Holtzclaw et al. . |
| 3,557,893 | 1/1971 | Kohls . |
| 3,669,206 | 6/1972 | Tax et al. . |
| 3,770,070 | 11/1973 | Smith . |
| 3,942,823 | 3/1976 | Shields et al. . |
| 4,067,469 | 1/1978 | Biaggini et al. . |
| 4,130,208 | 12/1978 | Barry ................................. 414/334 |
| 4,137,984 | 2/1979 | Jennings et al. . |
| 4,190,393 | 2/1980 | Landow ............................ 104/29 X |
| 4,385,857 | 5/1983 | Willetts . |
| 4,595,331 | 6/1986 | Thompson et al. . |
| 4,620,603 | 11/1986 | Reeves et al. . |
| 4,629,020 | 12/1986 | Thurman . |
| 4,629,391 | 12/1986 | Soyk et al. . |
| 4,644,237 | 2/1987 | Frushour et al. . |
| 4,647,784 | 3/1987 | Stephens . |

FOREIGN PATENT DOCUMENTS 456822 4/1971 Canada .
2531057 6/1976 Fed. Rep. of Germany .

Primary Examiner—David A. Bucci
Assistant Examiner—Craig Slavin
Attorney, Agent, or Firm—Barnes & Thornburg

[57] ABSTRACT

Method for loading and unloading semitrailers on a train of flat cars by coupling the semitrailers to power driven stanchions respectively, providing the power driven stanchions with automatic control in the form of proximity sensors for governing movement of the semitrailers in accordance with proximity of adjoining semitrailers and automatically steering the stanchions along a guide path to load and unload the train.

8 Claims, 11 Drawing Sheets

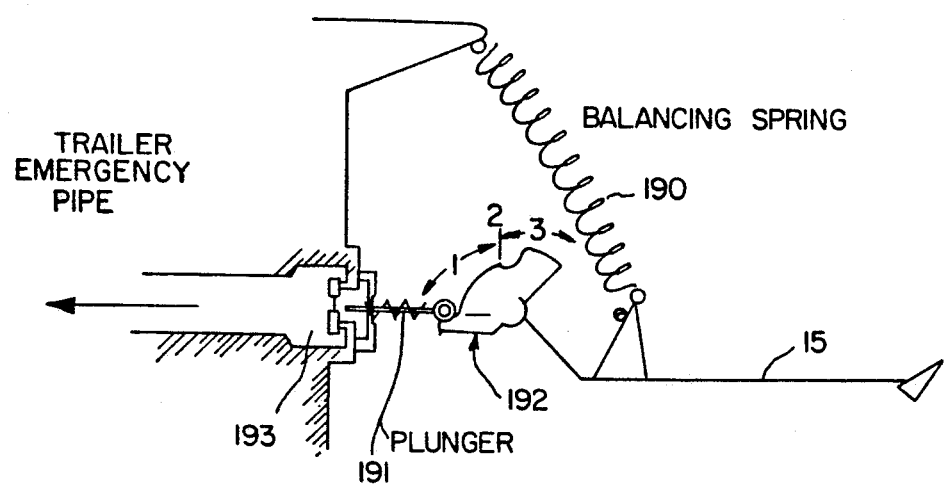
FIG. 12
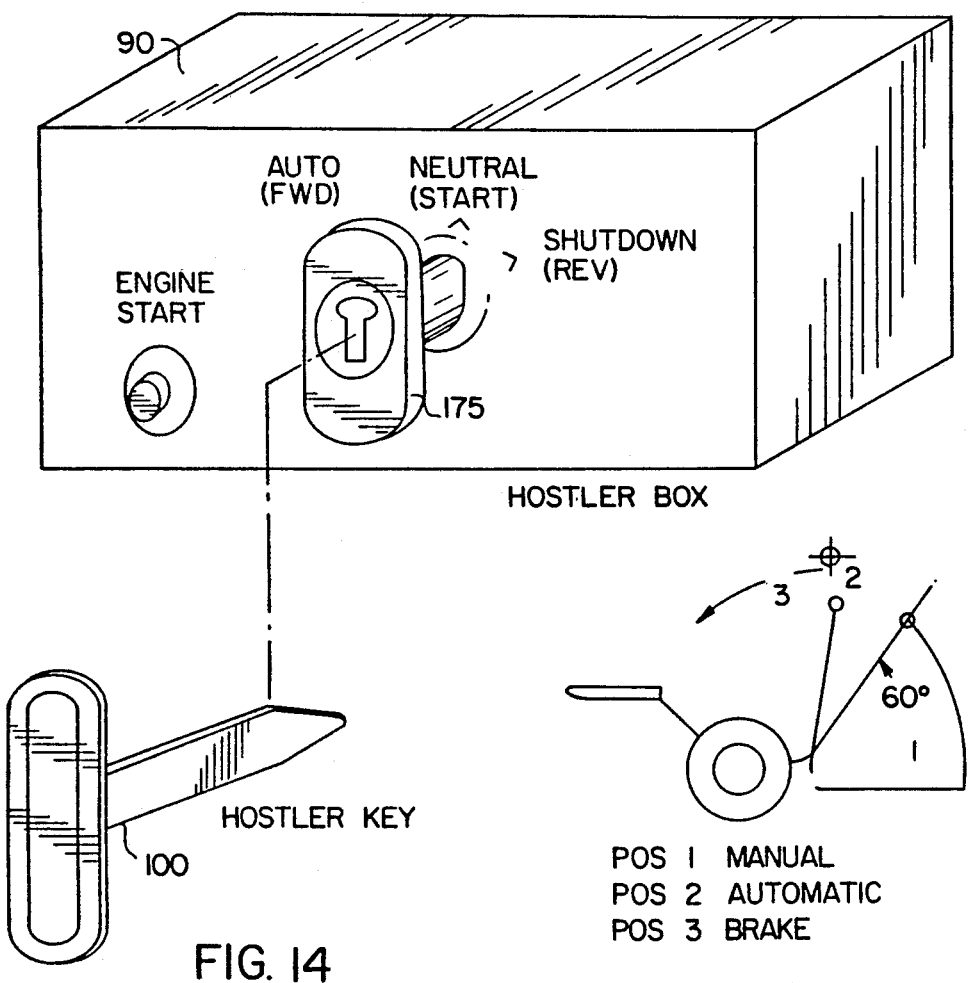
FIG. 14
POS 1 MANUAL
POS 2 AUTOMATIC
POS 3 BRAKE
FIG. 11

METHOD FOR SEMITRAILER TRANSFER

This application is a division of Ser. No. 195,453, filed May 24, 1988, now U.S. Pat. No. 4,973,206, issued Nov. 27, 1990, which in turn is a continuation in part of Ser. No. 64,142, filed June 18, 1987, abandoned.

BACKGROUND OF THE INVENTION

This invention relates to a method for transferring semitrailers from one point to another as, for example, in the loading and unloading of railway flat cars or between dock and storage in an industrial plant or other controlled access area. In particular, the invention is directed to a method and apparatus for transferring semitrailers using automatically guided, power-driven, fifth wheel stanchions. The invention is also directed to a power driven stanchion that is capable of manual and/or automatic operation.

A usual practice in a system for loading semitrailers on flat cars is to use a specially devised tractor to position the semitrailers, one trailer at a time, on a flat car of a train or, alternatively, to pick the trailers up bodily with a crane. One such system is disclosed in U.S. Pat. No. 2,903,977 in which the tractor has a fifth wheel coupling that can be elevated for coupling to a semitrailer to be loaded on a train, and after loading, the tractor support of a semitrailer is replaced by a pedestal for supporting and securing the semitrailer during its journey. My copending Patent Application No. 853,561, filed Apr. 18, 1986, discloses another system using a power driven stanchion, which is provided for each semitrailer and remains coupled thereto for use in unloading its associated semitrailer at its destination. In each of these systems, the semitrailers can be loaded or unloaded only one at a time. This is time consuming and labor intensive.

BRIEF SUMMARY OF THE INVENTION

An object of the present invention is to provide a method and apparatus for loading and unloading a train with semitrailers which substantially obviates one or more of the limitations and disadvantages of the above described prior systems.

Another object of the present invention is to materially reduce the cost of operations and/or the time required in loading and unloading semitrailers on and off flat cars.

Still another object of the present invention is to substantially automate the loading and unloading of a train of flat cars.

Yet another object is to provide an automated system for automatically moving semitrailers between a train and loading/unloading areas of between a loading/unloading dock and storage within an industrial plant or other controlled access area.

Even another object is to provide a system for automatically parking and retrieving semitrailers for storage prior or subsequent to travel on a train.

A further object of the present invention is to provide apparatus for substantially automating the loading and unloading of semitrailers on flat cars.

Yet a further object of the invention is to provide a novel and improved, power driven stanchion.

Still a further object of the invention is to provide a battery powered, opportunity charged drive system for a stanchion, such that its battery can be charged and power provided to it at any time it is on the deck of the train.

Even a further object of the invention is to provide a power driven stanchion capable of manual and/or automatic operation.

BRIEF SUMMARY OF THE INVENTION

Briefly the present invention is embodied in a method of loading and unloading a train of flat cars with semitrailers by means of a power driven stanchion with a fifth wheel. In accordance with the first step, the stanchion is coupled by way of its fifth wheel to a semitrailer. In the next step, the stanchion and its associated semitrailers are moved along a guideway that is disposed partly in the rail terminal yard and partly in a path extending along the beds of the flat cars longitudinally of the train such that inbound semitrailers aboard the train are unloaded and that outbound trailers are loaded from the yard onto the train. In a third step of the method, close proximity to the vehicle ahead along the guideway is sensed and in response thereto, the stanchion and its associated semitrailer are slowed to a halt so as to avoid collision.

In a further step of the invention, the stanchions are locked to the flat car deck in response to deactivation of the stanchions.

In still a further step, the stanchions act in response to deactivation of their motive power to release fluid pressure from the spring applied brakes of the associated semitrailers for causing the brakes to be applied.

In still a further step of the invention, the inbound semitrailers are unloaded from one end of the train contemporaneously with the loading of outbound semitrailers from the opposite end of the train.

The present invention is also embodied in a system for loading and unloading a train of flat cars with a plurality of semitrailers. The system includes a guideway that extends along the beds of the cars longitudinally of the train and into the yard and further includes a motive means coupled to each semitrailer and arranged to coact with the guideway to move inbound semitrailers from the train to the yard and to move outbound semitrailers from the yard onto the flat cars along the guideway. The guideway comprises a guide rail that extends longitudinally on the decks of the flat cars as well as a buried cable extending throughout in a predetermined pattern in the terminal yard.

In still another embodiment of the invention, a system is provided for loading and unloading a train of flat cars with a plurality of semitrailers. This system includes power driven fifth wheel stanchions for coupling to the front ends of the semitrailers. The power driven stanchions have locking clamps that are adapted to engage flanges of a longitudinal guideway on the deck of the flat cars.

In addition, a means is provided to render such clamps effective for locking when the semitrailers are loaded in traveling positions on the bed of the flat cars.

In addition, the invention includes proximity sensing means able to either slow or halt the vehicle when the presence of an object is detected in its path.

The invention is further embodied in a power driven stanchion operable to transfer a semitrailer from one point to another along a guideway, the semitrailer having a brake and the guideway including a guide element. The stanchion has a fifth wheel means that is coupled to the semitrailer and a motive means for moving the stanchion. An automatic steering means is operable to coact with the guide element to automatically steer the stanchion and associated semitrailer along the guideway.

A further feature of the power driven stanchion according to the present invention is a means responsive to turn off of the motive power means to apply the semitrailer brakes.

The invention is further embodied in a power driven stanchion that has motive means and steering means. A handle is provided that has a first position for manual control of the motive means and the steering means. The handle has a second position that enables automatic operation of the motive means and the steering means along a guideway. The handle is operable in a third position to disable the motive means so as to bring the stanchion to a halt.

For a better understanding of the present invention, together with other and further objects thereof, reference is had to the following description taken in connection with the accompanying drawings, while its scope will be pointed out in the appending claims.

BRIEF DESCRIPTION OF DRAWINGS

FIG. 11 is a partial diagram in elevation that illustrates the three positions of a multi-position maneuverable handle for the power driven stanchion;

FIG. 12 is a diagram in elevation showing the three position maneuvering handle together with its relationship to the semitrailer emergency brake pipe;

FIG. 14 is a perspective view of a hostler control device that is provided with the power driven stanchion;

DESCRIPTION OF PREFERRED EMBODIMENT

It is contemplated that the semitrailer transfer method and apparatus and the power driven stanchion embodying the present invention can be employed in any application requiring movement of semitrailers within a controlled access area as, for instance, between a docking area and a storage area in a plant or in a freight yard or between a train of flat cars and a terminal yard. However, by way of example and completeness of description, the invention will be herein described in respect of the movement (loading and unloading) of semitrailers between a terminal yard and a train of flat cars.

Figure 1:
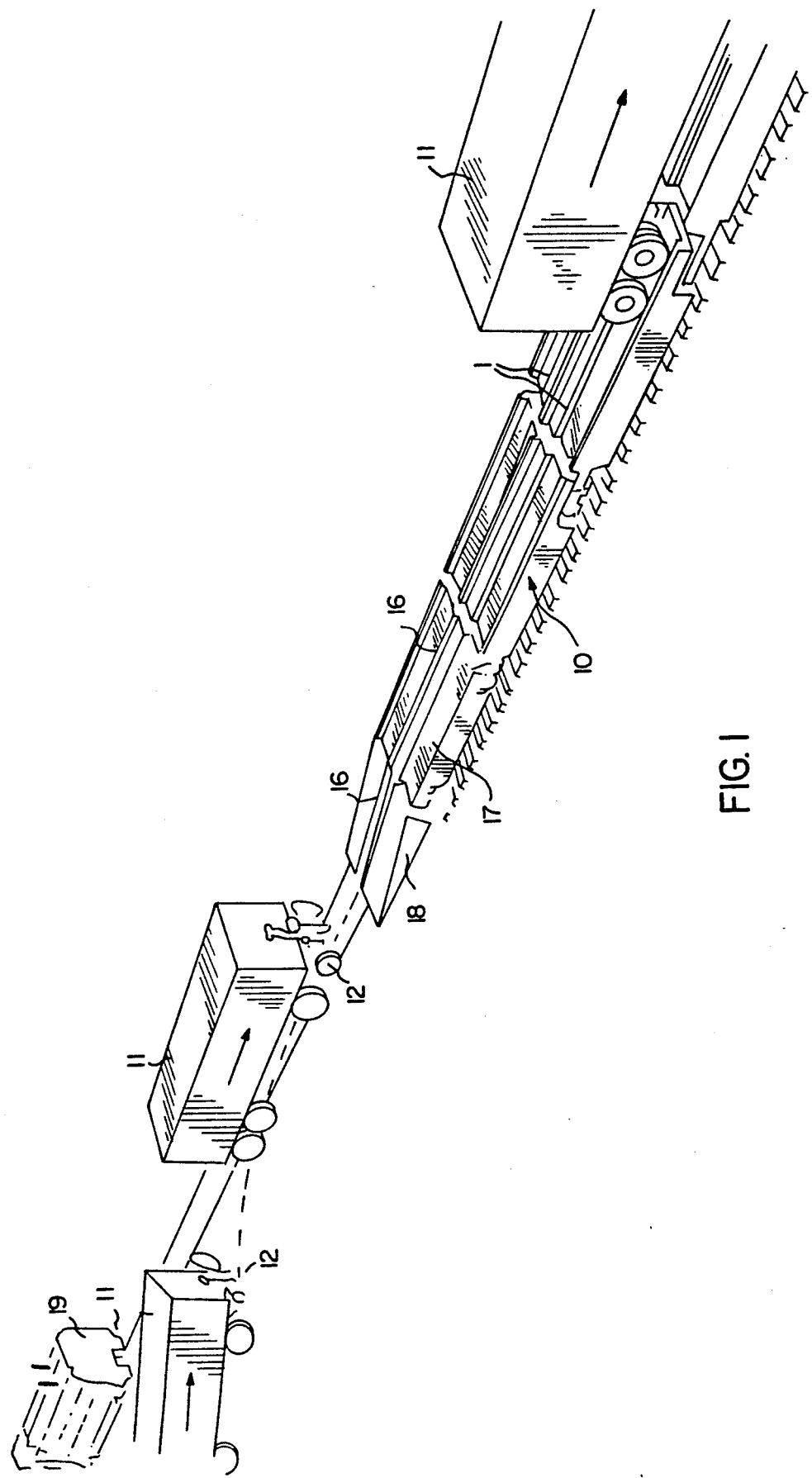
FIG. 1 is a view in perspective of a section of a train of flat cars being loaded with semitrailers having power driven stanchions attached thereto.
Figure 2:
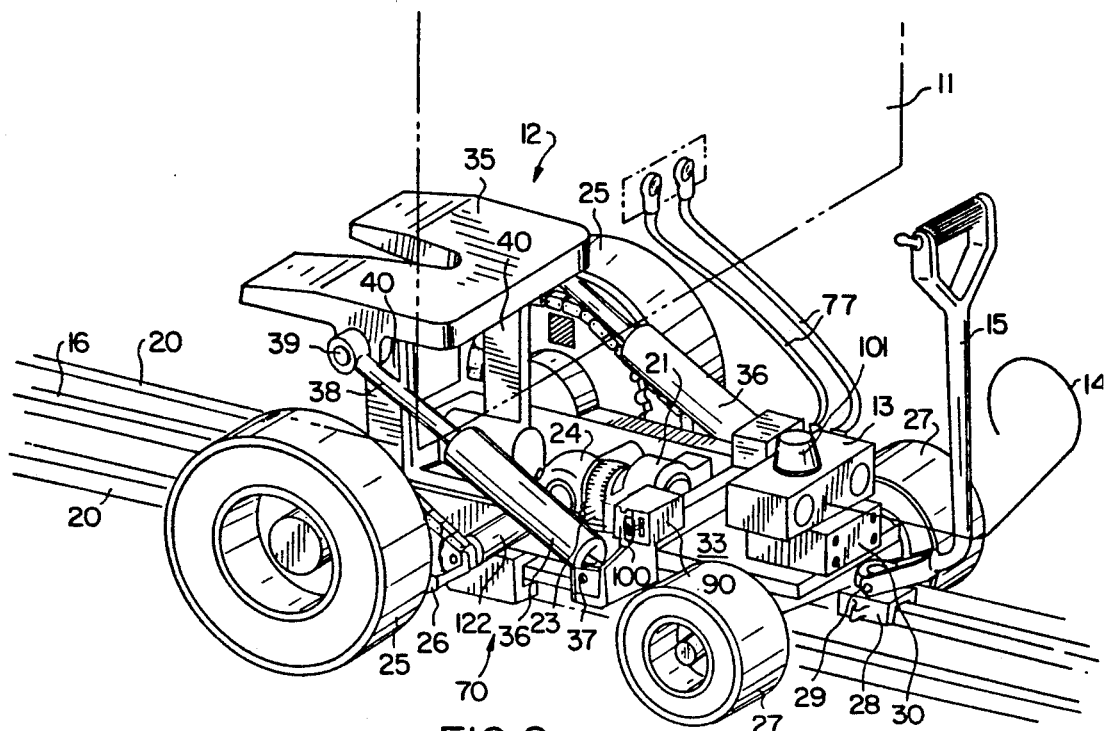
FIG. 2 is a view in perspective of an automatically operated power driven stanchion for loading the semitrailers on the flat cars according to a preferred embodiment of the present invention.
Figure 3A:
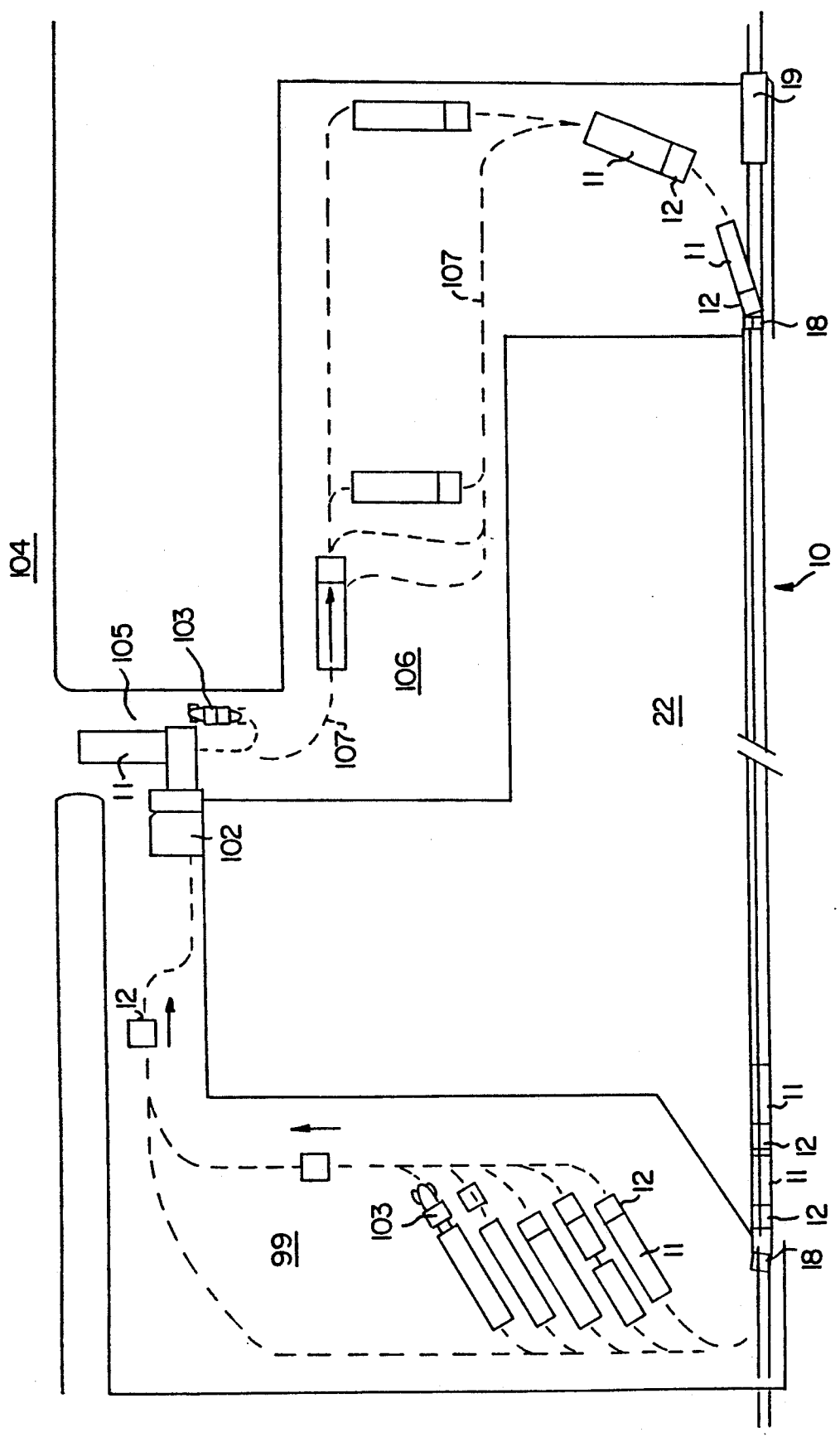
FIG. 3A is a diagram according to a preferred embodiment of the present invention of a semitrailer terminal for loading and unloading semitrailers on a train of flat cars.

With reference to FIGS. 1, 2 and 3A, the method of transferring semitrailers between a terminal yard 22 (FIG. 3) and a train of flat cars 10 in accordance with the invention will now be described. Generally in accordance with the first step of the method, a power driven stanchion 12 is first coupled to an outbound semitrailer and stays so coupled throughout the loading process, its journey on the train and the unloading process at its destination terminal where it is disconnected and readied for connection to another outbound semitrailer.

The power driven stanchion is equipped with a fifth wheel 35 (FIG. 2) which is arranged for coupling to the semitrailer king pin. This coupling step is performed in the terminal yard 22, preferably in its service driveway 105 (FIG. 3A), upon arrival of a semitrailer driven over highway 104 by a roadway truck 103. Upon such arrival, the associated truck unit 103 is disconnected and removed. The semitrailer then rests on its landing gear with its brakes applied.

An operator then takes a stanchion from the office, storage and test shed 102 and, using its manual control handle 15 (FIG. 2), places it under the semitrailer and on the king pin to which it latches. The operator then operates the fifth wheel lift (in a manner to be described hereinafter) to raise the trailer landing gear off the ground and moves the trailer ahead toward an outbound parking lot 106.

The power driven stanchion 12 is equipped with a guidance mechanism comprised of a mechanical shoe or U-shaped bracket 28 and a signal sensing device 30. In accordance with a second method step of the invention, this guidance mechanism is arranged to coact with a guideway extending in a desired path in the yard 22 and further extending longitudinally of the decks of the cars 10 so as to automatically transfer the inbound and outbound semitrailers between the terminal yard 22 and the flat cars 10.

The guideway in the yard 22 is illustrated in FIG. 3A as a buried cable 107 that through current flow generates an inductive field that is sensed and tracked by guidance mechanism 30 of the stanchion so as to steer the stanchion and its associated semitrailer along the path of the buried cable 107. As illustrated in FIG. 3, that path starts near the service driveway 105 and continues to the outbound semitrailer parking area 106 and from there to a loading ramp 18 for the flat cars 10.

The buried cable guideway 107 also extends between the office, storage and test shed 102 and an inbound parking area 99 and from such parking area to another ramp 18 located The guideway extending along the cars 10 and the right and left hand ramps 18 consists of a rail or bar 16 extending longitudinally over the bed 17 of the flat cars of the train 10 and down the ramps 18 (FIG. 1). The guidance mechanism or shoe bracket 28 is arranged to coact with the guideway rail 16 so as to steer and guide the power stanchion 12 and its associated semitrailer 11 along the ramps and flat car decks.

Thus, in accordance with the second step of the invention, the operator, after coupling the stanchion to the semitrailer, maneuvers the stanchion over the guideway 107 near the service driveway 105. The operator then inserts a key 100 into a control box 90 on the stanchion and turns it to an automatic position whereby the stanchion and semitrailer move unattended along the guideway 107 to the outbound parking area 106.

The current flow is switched by manual or automatic means (not shown) sequentially from one outbound parking cable branch to another. Absent the guide signal, the robot stops automatically. Hence, only that cable branch in parking area 106 that is to receive the outbound semitrailer will be turned on to receive current for this part of the process.

When the train arrives, its locomotive 19 is disconnected and loading/unloading ramps 18 are positioned at the left hand and the right hand ends of the train of flat cars. An operator starts the first semitrailer in the train (the one whose stanchion is facing off the end of the train) by insertion of the key 100 into the stanchion control box 90 by turning it to "start" and then to "auto" (see FIG. 14). This releases the stanchion tie down mechanism, releases the semitrailer brakes and sets the stanchion and associated semitrailer into motion. It then travels unattended along the guide rail 16, off the train, down the ramp and along the guide cable 107 to the end of the cable which is at a predetermined spot in the inbound parking area 99. The current flow is switched by either manual or automatic means (not shown) sequentially from one inbound parking cable branch to another. Absent the guide signal, the stanchion stops automatically.

As soon as the first stanchion has been set in motion on the train, the operator proceeds back along the train to the next stanchion where he repeats this operation, continuing for all of the semitrailers on the train. After parking in inbound lot 99, the semitrailers can be hauled away be respective truck units 103 as convenience dictates.

To load the outbound semitrailers, the respective stanchions are started one by one and moved sequentially onto the guideway 107 between the outbound parking area 106 and the right hand ramp 18 where they proceed one by one onto the train. In accordance with the third step of the method embodying the invention, each power stanchion is equipped with a proximity sensor that senses close proximity to a semitrailer ahead and slows the stanchion and associated semitrailer to a halt so as to avoid collision. This is extremely significant as it allows a semitrailer to be loaded or unloaded before the semitrailer ahead has reached its inbound parking position in area 99 or its outbound parking position on the train. The proximity sensor in one embodiment takes the form of a cat whisker 14 (FIG. 2) as will be described in detail below.

A further step of the invention involves locking a stanchion to the flat car deck upon turn off of its associated motive power. To effectuate this step, the stanchion is equipped with a locking clamp 7 that is operable in response to turn off of the motor power to engage flanges 20 of the guide rail 16 in a locking relationship. When an outbound stanchion and trailer has reached its parking positions on the train 10, an operator ascertains whether the stanchion and associated trailer are properly lined up for clamping or locking, moves the stanchion by manual control if necessary (to assure that a tire is not over a gap between car decks) and then shuts off the stanchion. This procedure is repeated for each outbound stanchion.

Still a further step of the invention involves releasing fluid pressure from the spring applied brakes of the associated semitrailer so as to cause such brakes to be applied in response to turn off of the stanchion and motive power. To effectuate this step, the stanchion is equipped with brake hoses 77 comparable to air brake connections that are normally made to a highway truck adapted for coupling to a semitrailer 11.

In accordance with yet another step of the method of the present invention, the semitrailers are unloaded from one end (left hand end in FIG. 3A) of the railway flat cars contemporaneously with the loading of semitrailers from the opposite end (right hand end) of the flat cars. This step is made possible by the proximity sensor 14 on each of the stanchions which is arranged to avoid collisions.

Figure 3B:
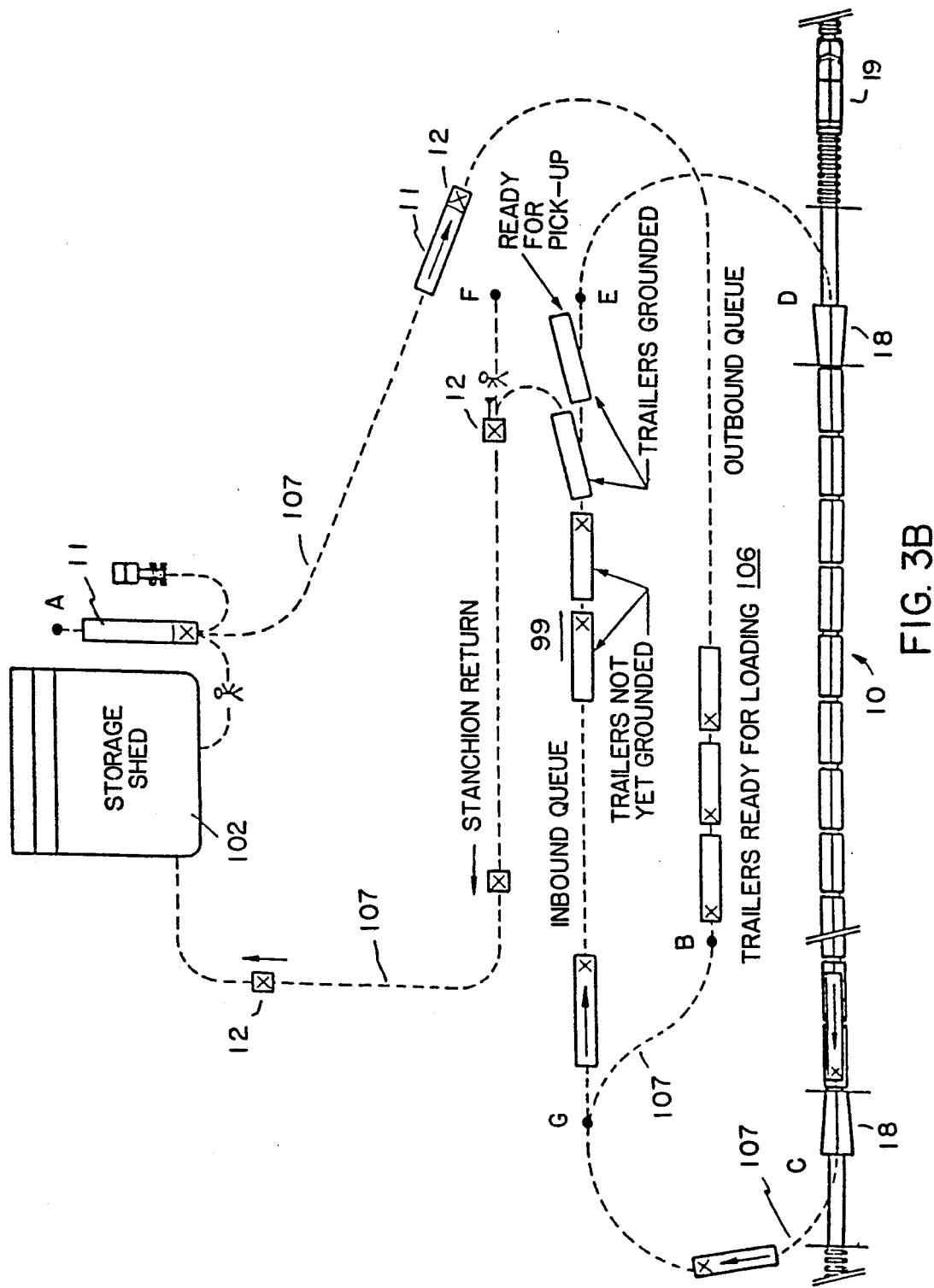
FIG. 3B is a diagram according to another preferred embodiment of the present invention of a semitrailer terminal for loading and unloading semitrailers to and from a train of flat cars.

In FIG. 3A the inbound and outbound parking areas are illustrated as parallel parking schemes. FIG. 3B shows in diagrammatical form an alternative terminal yard arrangement wherein the inbound lot 99 and outbound lot 106 consist of sequential queues of semitrailers. In the FIG. 3B outbound queue the stanchion and associated semitrailer will move either to the end of the queue and stop because of no signal in the cable beyond point B, or will stop behind a preceding trailer because of the operation of the stanchion proximity sensing system to be described below. At this point, the stanchion can either idle or be turned off (automatically or manually), depending upon the particular operation.

The unloading operation is essentially the same as described with respect to FIG. 3A. After the inbound stanchions are started, they proceed down the lefthand ramp 18 along the guideway between points c and G to the inbound queue in inbound parking lot 99. The stanchion and its associated semitrailer will move either to the end of this queue and stop because of no signal in the cable beyond point E or it will stop behind a preceding trailer because of the operation of the stanchion proximity sensing system. An operator can then turn off the stanchion, thereby resulting in an application of the semitrailer air brake. The operator then moves the stanchion over to the stanchion return thoroughfare, starts its engine, and places it in the automatic mode for its return trip along cable 107 to the storage shed 102.

When the inbound semitrailers have all been unloaded, the loading of the outbound trailers can begin. The current flow is switched on between points B, G and C so as to enable the loading process. The operator then, beginning with the first stanchion in the outbound queue, starts each of the stanchion engines in order. The outbound stanchions and their associated semitrailers then begin to move along the BGC path up the left hand ramp 18 and along the bed of flat cars 10. The remainder of the process proceeds in the manner described above with respect to FIG. 3A.

It should be noted, that the semitrailers can actually be either loaded or unloaded from either end of the train of flat cars. Thus, for example, the inbound trailers could be unloaded via the right hand ramp 18 and the guideway path D-E to the inbound queue.

Similarly, other loading and unloading procedures are available for the FIG. 3A scheme. For instance, the train could be completely unloaded prior to a loading operation with each operation taking place from opposite ends of the train as described above, or with both operations taking place from one end of the train.

With reference to FIG. 2, a power driven stanchion 12 embodying the invention is illustrated as being driven by a combined internal combustion engine and hydraulic pump 21 which drives propulsion axles 22 through a variable hydrostatic transmission 23 and a right angle differential 24. The axles 22 deliver power to drive wheels 25 through a chain drive 26. Using the hydrostatic transmission 23 to couple the engine 21 to the drive wheels 25 permits simple automation of the vehicle speed control and also permits the gear ratio to be varied so as to permit the vehicle to run slower at high torque when climbing the ramp to the deck of the flat car train 10 or when negotiating gravel unpaved portions or the terminal area 22 lots as opposed to smoother roadway.

Figure 5:
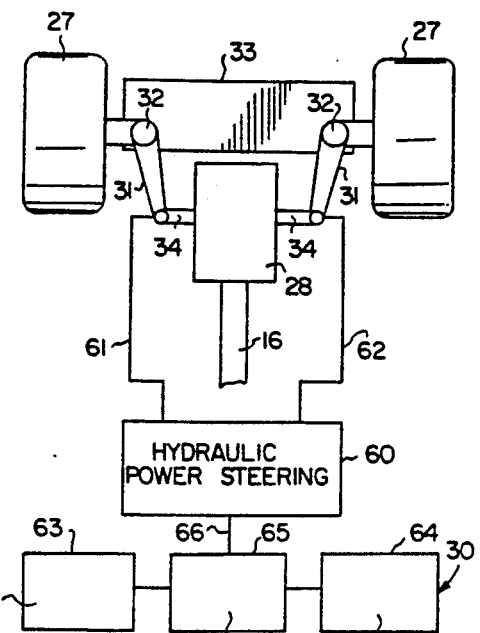
FIG. 5 is a plan view, partly by block diagram, of a steering mechanism for the power driven stanchion of FIG. 2.

The steering wheels 27 (see FIGS. 2 and 5) are controlled either by operation of the manual lever 15 which is pivoted at 29, to the U-shaped steering bracket 28, or by coaction of the bracket 28 with the guide bar 16 extending throughout the length of the train 10, or automatically by sensing a buried cable with the apparatus 30 when operating in the yard of the terminal 22 (see FIG. 3). With reference to FIG. 5, a steering mechanism is conventionally illustrated as having cranks pivoted by king pins 32 to a frame 33 and connected to guide bracket 28 by linkages 34.

With reference to FIG. 5, the apparatus 30 for sensing steering guidance signals is illustrated more in detail as having a power hydraulic steering mechanism 60 connected over lines 61 and 62 to the steering bell cranks 31. Left and right guidance sense apparatus 63 and 64 provide inputs for an error signal generator 65, which in turn governs direction of power steering of the wheels 27 over line 66. This apparatus is rendered effective in response to the error signal generator 65 in accordance with conventional servomechanism principles to guide the stanchion along the guidance cable 107.

The stanchion 12 is illustrated in FIG. 2 as having a proximity detector 13 which includes a cat whisker sensor 14 extending ahead of the power driven stanchion for controlling it in accordance with its proximity to the next preceding semitrailer 11 (the semitrailer ahead). The detector 13 responds to deflection of the cat whisker 14 caused by contact with the trailer ahead to apply the stanchion brakes. In addition, the proximity sensor detection system 13 may also include a noncontact ranging device, as for example either a sonar or an infrared sensor. This noncontact ranging device will sense the approach to a semitrailer and reduce stanchion speed prior to actual contact by the cat whisker 14 with the vehicle ahead or other obstruction. That is, the noncontact ranging means will include sensor means and means responsive to a sensed approach to such an obstruction or trailer ahead to reduce (not shown) to the internal combustion engine and the hydraulic pump 21 and/or the hydrostatic transmission 23. A control knob 101 is provided for adjustment of the sensitivity of the proximity detection system.

With reference to FIG. 2, the fifth wheel 35 is illustrated in its elevated position in which it is actuated by hydraulic cylinders 36 that are pivoted at 37 and have their push rods 38 connected to the fifth wheel platen 35 at 39. The platen 35 is connected to upright support arms 40 by the journal pin 39 at one end of the arms 40, and the lower end of the arms 40 being pivotally connected to the frame 33 of the power driven stanchion 12.

Figure 4:
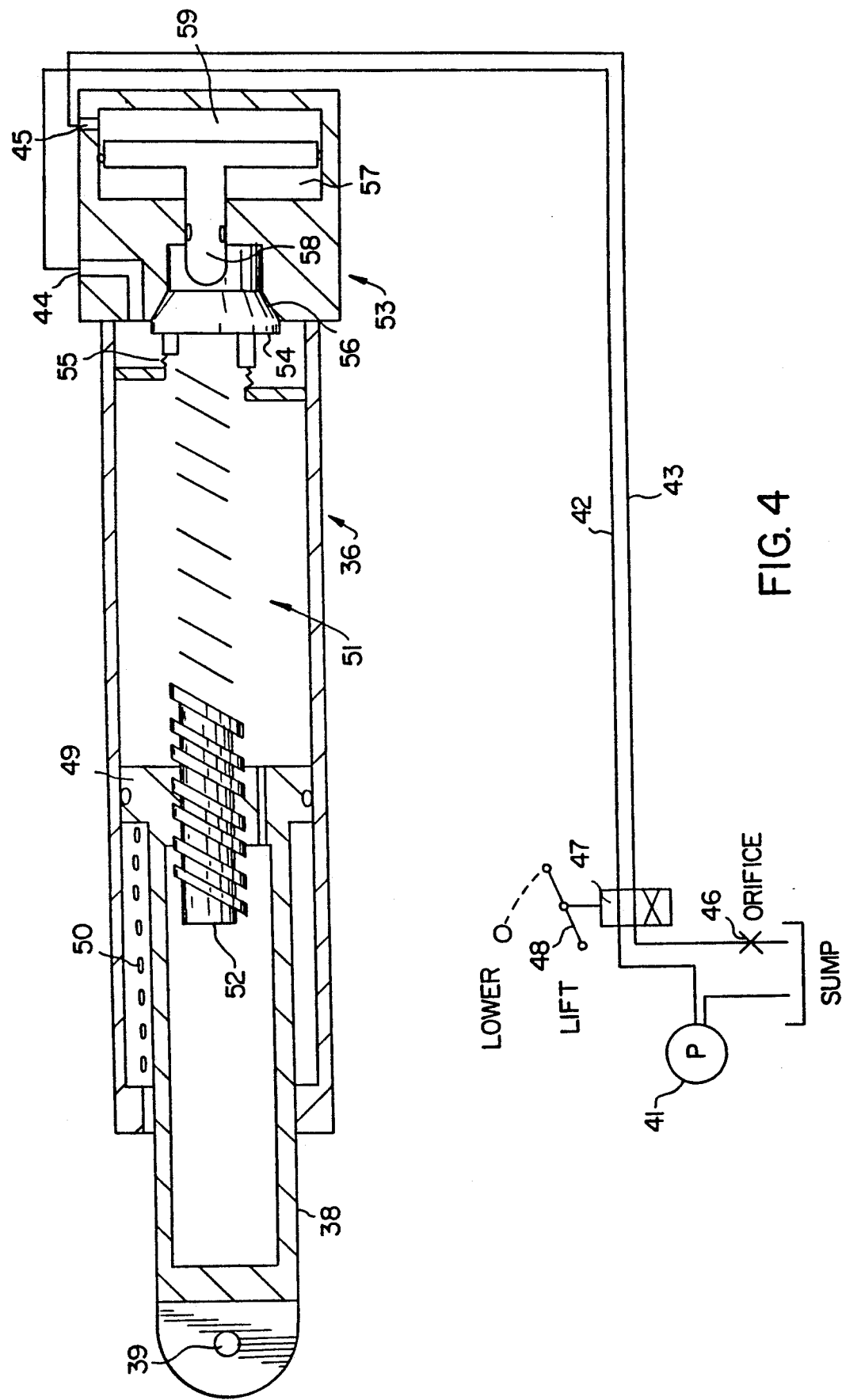
FIG. 4 is an elevational view, partly in cross section, and partly by diagram of a power cylinder and locking system for elevating a fifth wheel coupling of the automated stanchion of FIG. 2.

In FIG. 4, which is an enlarged view of the hydraulic cylinder 36 for lifting the platen 35, a hydraulic pump 41 supplies fluid pressure selectively over passages 42 and 43 to ports 44 and 45 respectively at the right hand end of the cylinder 36 for selectively raising the platen 35 and unlocking the mechanism to permit retraction of the platen at a rate controlled by a choke 46. Selective control of the hydraulic circuit is by a hydraulic valve 47 that can be selectively actuated manually or by remote control of a lever 48. The hydraulic cylinder 36 comprises a piston 49, a push rod 38, and a release spring 50.

A locking mechanism 51 is provided for locking the cylinder 35 in its extended position wherein the platen 35 is raised sufficiently to lift a semitrailer 11 off of its landing gear supports (not shown). The locking mechanism 51 comprises a high lead locking screw 52 similar to that used in railway slack adjusters that will not permit lowering of the semitrailer to occur as a result of any hydraulic breakage or leakage, but only when hydraulic pressure is applied to release the locking of the rod 52. This is accomplished by the right hand end of the locking screw 52 having a clutch and release mechanism 53 including a conical clutch face 54 biased by a spring 55 against a complimentary fixed face 56 of the locking mechanism 53. This clutch 54 prevents the retraction of the push rod 38 in the cylinder 36, except when the clutch 54 is released by hydraulic operation of a piston 57 and push rod 58 to raise the clutch 54 off of its seat 56 by building up fluid pressure in chamber 59 as selected by the operation of the hydraulic valve 47 to its position for lowering the platen 35.

Figure 6:
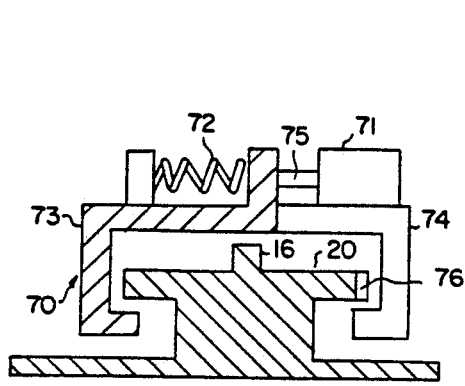
FIG. 6 is an elevational view, partly in cross section, illustrating a section of guideway along the deck of the flat cars together with a locking mechanism on the power driven stanchions for locking the semitrailers on the flat cars.

With reference to FIGS. 2 and 6, each of the power driven stanchions 12 has a locking clamp 70 that is released as shown in FIG. 6 by a solenoid 71 that is energized whenever the combined motor and pump 21 is operating. This compresses a spring 72 to separate clamp jaws 73 and 74 from engaging ends of flanges 20 adjoining the guideway 15 which extends longitudinally on decks 17 of the flat cars 10. Upon the stopping of the motor 21 when the power driven stanchion has been fully positioned to its proper location for shipping on a flat car, the motor is shut off, and the plunger 75 is retracted to permit the clamps 73 and 74 to engage the flanges 20. This engages teeth 76 as shown in FIG. 6 for at least the right hand flange 20 to securely lock the power driven stanchion to the deck 17 and to prevent longitudinal movement of the associated semitrailers 11 along the guideway. Brakes of an associated semitrailer 11 are also set at this time by the shutting off of the motor 21 by venting air through brake hoses 77 (see FIG. 2), which are comparable to air brake connections that are normally made to a highway truck adapted for coupling to the semitrailer 11.

Figure 7:
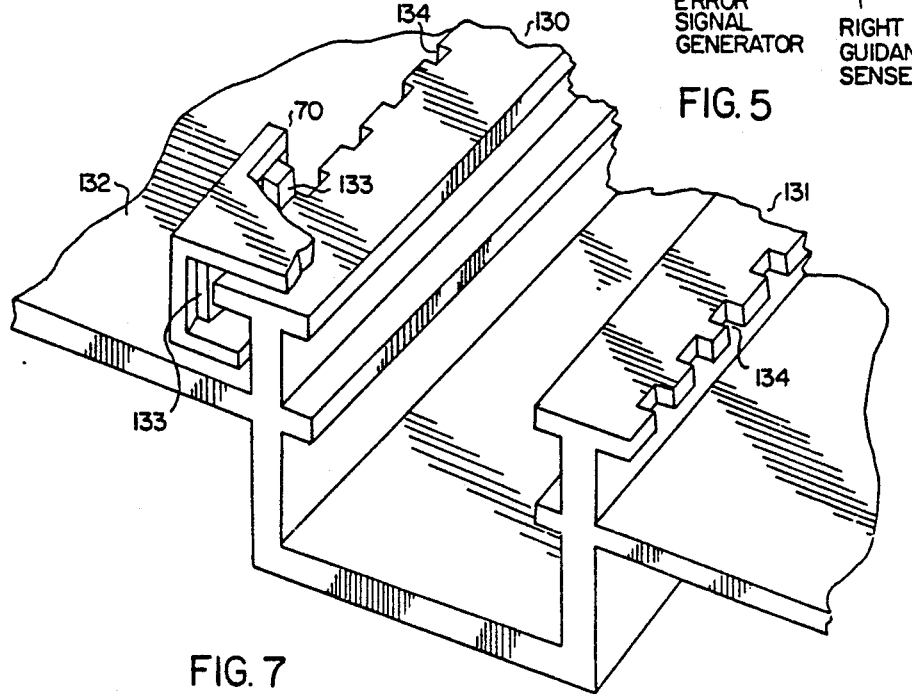
FIG. 7 is a partial view in perspective illustrating another embodiment of a guideway along the deck of the flat cars.

FIG. 7 illustrates an alternative construction for the car deck, stanchion locking clamp 70 and guide member 28. As there illustrated, the car deck has a pair of spaced apart parallel and longitudinally extending flanged rails 130 and 131. Each flange together with the car deck surface 132 forms a channel which is arranged to mate and coact with the stanchion locking clamp 70 which, for the sake of convenience, is only partially shown without its associated solenoid mechanism. The clamp 70 has a slotted construction 133 which is adapted to mate with The stanchion U-shaped guide 28 can be located over either or both of the flanged rails 130 or 131, though not illustrated in FIG. 7 for the sake of convenience. In the alternative, two U-shaped guides 28 can be used, one for each flanged rail 130 and 131.

Figure 8:
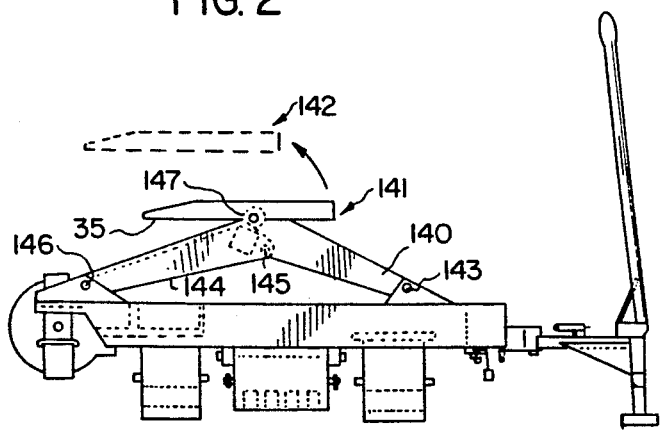
FIG. 8 is an elevational side view of the power driven stanchion illustrating a modified fifth wheel elevating mechanism also embodying the invention.

FIG. 8 illustrates an alternative construction of the fifth wheel lifting mechanism also embodying the present invention. This construction includes a pair of ram-type lift cylinders 140 (corresponding to the left and right cylinders 36 in FIG. 2) arranged to raise and lower the fifth wheel 35 between its lower position at 141 and its upper or elevated position at 142. To this end, cylinder 140 has one of its end pivotally mounted to the stanchion frame member at 143 and its other end pivotally attached to upright member 144 at 145. The upright member 145 has its other end pivotally mounted to the stanchion frame at 146. The fifth wheel is linked to the upright member 144 via connecting bracket 147 which is a part of strut 144.

Figure 9:
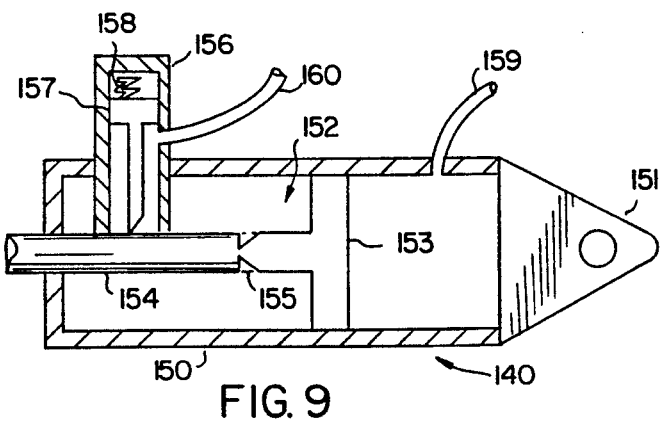
FIG. 9 is an elevational view, partly in cross-section, of a power cylinder and locking system for the elevational mechanism of FIG. 8.

The lift cylinder 140 is shown in more detail in FIG. 9 to have a casing 150 illustrated in cross-section and a pivot member 151 illustrated in elevation. The pivot member 151 is adapted for connection to the frame member at pivot 143. Illustrated in elevation is a ram 152 having a head 153 and a push rod 154. The ram 153 is adapted for movement longitudinally of the casing 150 by means of the application and release of hydraulic pressure via port connection 159. Thus, to lift the fifth wheel 35, hydraulic pressure is applied via port connection 159 so as to move the ram to the left. The push rod in FIG. 9, though cut off for convenience sake, ultimately extends for connection at the point 145 in FIG. 8.

In its fully extended position (corresponding to the elevated position of the fifth wheel 35) a notch 155 in the push rod 154 is engaged by a latch 156 so as to lock the ram in the fully extended or elevated position. To this end, the latch 156 is shown as having a latching member 157 which is spring-biased by means of spring 158 against the push rod 154. To lower the fifth wheel (retract the ram 153), hydraulic pressure is applied via port connection 160 to overcome the bias of the spring 158, thereby releasing the latch member 157 from the notch 155. Contemporaneously, hydraulic pressure is vented by way of port connection 159 so as to allow the ram 153 to move to the right to its retracted position.

The flat car construction can assume any form suitable for intermodal or integrated train hauling. By way of example and completeness of description, reference is made to my copending patent application Ser. No. 853,562, filed Apr. 18, 1986 and entitled "An Articulated Car For Integrated Trains" for a more complete description of a flat car and coupling mechanism suitable for use in intermodal and integral trains that can also be used in the practice of the present invention.

Figure 10:
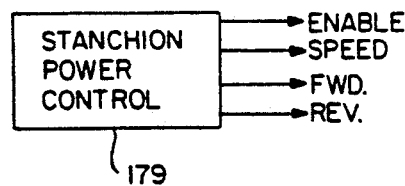
FIG. 10 is a block diagram of a power train or motive means for the power driven stanchion.
Figure 10:
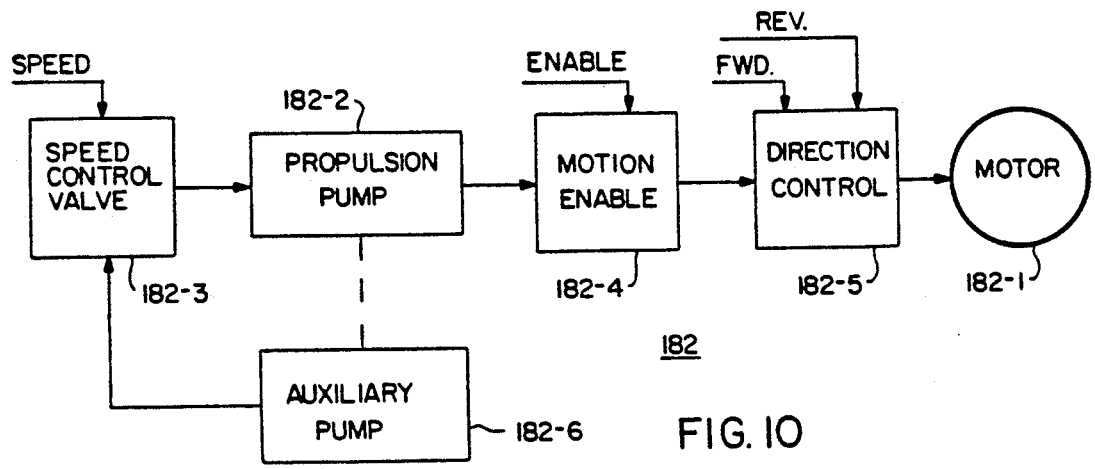

With reference now to FIG. 10, there is illustrated a block diagram of the propulsion pump and motor system 182 for the stanchion. This system includes an hydraulic motor 182-1 that is driven by a propulsion pump 182-2 under the control of a speed control valve 182-3, a motion enable valve 182-4 and a direction control valve 182-5. Each valve is a conventional solenoid valve that is controlled by the electrical signal connections as illustrated in FIG. 10.

The propulsion pump 182-2 is a variable displacement hydraulic pump with its swash plate control arranged to operate in either a maximum displacement position adjusted by a screw so as to produce hydraulic fluid output that will result in a maximum vehicle speed (say 8 ft. per second) and a minimum displacement position with its own independent screw adjustment so arranged that pump output will correspond to a minimum vehicle speed (say 1 ft. per second). Mounted on the propulsion pump shaft is an auxiliary pump 182-6 arranged to supply oil to a number of auxiliaries in the stanchion control (such as the lift cylinders) but which are not germane to this diagram and therefore not illustrated. The auxiliary pump 182-6 does, however, supply oil to the swash plate control cylinder of the propulsion pump via the speed control valve 182-3. When the speed control valve solenoid is energized by the SPEED signal, the speed control valve is positioned to provide oil to the swash plate cylinder and increase pump displacement to maximum, corresponding to maximum motor speed. When the speed control valve solenoid is de-energized, the swash plate cylinder will be connected to sump via the speed control valve, thereby draining any oil from the swash plate cylinder. The swash plate is then returned by means of a return spring to its minimum displacement position, corresponding to minimum motor speed.

The motion enable valve is essentially a bypass or shut valve which, when closed shunts the pump output to sump. This is the disabled position. The valve changes to an enabled or open position in response to the ENABLE signal. In this position the pump output is permitted to pass directly to the direction control valve 182-5.

The direction control valve 182-5 is operable in response to the forward FWD signal to pass oil to the motor 182-1 for forward shaft rotation and in response to the reverse REV signal to pass oil to the motor 182-14 reverse shaft rotation.

In summary then, the motor 182-1 is operated in either the forward or the reverse direction at either minimum or maximum speed in response to the SPEED, ENABLE, FWD and REV signals supplied by the stanchion power control 179.

FIG. 11 illustrates that the handle has three distinct positions designated as position 1, position 2 and position 3. Each position constitutes a distinct input to the stanchion control mechanism. In position 1, the handle resides anywhere between the horizontal and a predetermined angle (say 60 degrees) above the horizontal. This is the manual position in which an operator can by means of the grip and flipper control (FIG. 13) cause the stanchion to move forward or backwards and the fifth wheel to go up or down.

Handle position 2 is defined as the 60 degree location to which the handle will be pulled by a balancing spring 190 (FIG. 12) if the operator is not holding it in position 1. As shown in FIG. 12, a plunger 191 and a cam 192 are operable to place the handle 15 in the 60 degree detented position 2 under the force of the balancing spring 190. In position 2, the stanchion will either be in an idle position or in an automatic mode, dependent upon the position of the key 100 and knob 175 in the hostler or stanchion control box 90 as will be described below.

Beyond handle position 2, the brake control is activated to an emergency brake application of the trailer. With reference to FIG. 12, the CAM 192 is operable to depress the plunger sufficiently to open the air brake vent valve 193 so as to exhaust air from the trailer emergency pipe.

Figure 13:
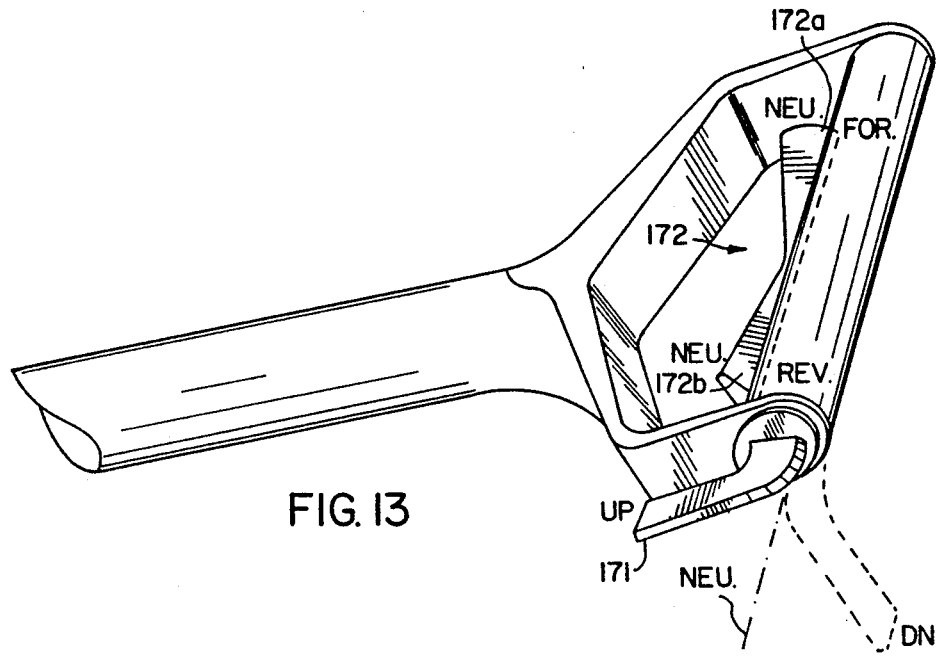
FIG. 13 is a perspective view of the handle grip illustrating a grip control, grip speed and motion control as well as a flipper control for the hydraulic fifth wheel lift.

Still referring to FIGS. 11-14, with the handle 15 in position 1 for manual operation, the control mechanism is conditioned to respond to the operator actuated flipper and grip controls 171 and 172. These controls are shown in FIG. 13 to be mounted on the handle grip. The flipper control 171 which controls the up and down movement of the fifth wheel is illustrated to have three positions, namely, up, down and neutral. The up position is illustrated by the solid line location of FIG. 13 and the neutral and down positions are illustrated by dotted line locations. The grip control 172 is shown to have a forward lever 172a and a reverse lever 172b. The operator can control the amount of power required (speed of the stanchion) by how far he depresses forward or reverse (as the case may be) levers 172a or 172b.

For automatic operation, the handle must be in position 2 and the key 100 must be inserted into the knob 175 on the hostler box 90.

As illustrated in FIG. 14, the knob 175 is operable to select one of three positions, each of which has two functions. With the key inserted, the knob is operable to select the functions forward (FWD), start (START) and reverse (REV). With the key removed, the knob 175 selects the other functions Auto, Neutral and Shutdown. Box 90 also has an engine start pushbutton which is interlocked with the knob. Functionally, operation of the hostler box 90 controls the starting of the engine and the connection of the power control system and steering control system to the proximity sensor 186 and the guideway sensor 185, respectively, so as to permit the stanchion to follow the guideway in the forward direction only or to follow it in reverse if the knob is held in reverse position by an operator. The stanchion will slow down or stop accordingly to the dictates of the proximity sensor system unless it is being overridden by the operator holding the knob in a forward or reverse position for final spotting purposes.

Referring once again to FIG. 15, a lift control 176 (illustrated in FIGS. 4, 8 and/or 9) is responsive to the flipper 171 to elevate and lower the fifth wheel by operation of the latch cylinder 156 and the lift cylinder 140 as described above in connection with FIGS. 4, 8 and/or 9. A steering control 177 is operable to guide the stanchion in response to (a) manual operation via manual steering input 172 or (b) automatic operation via input from the guide sensor 185. The steering control 177 includes the hydraulic power steering 60 and the bell crank steering linkage 31 and 34 of FIG. 5. The guide sensor 185 includes the guide cable sensing elements 63-65 and the guide bar sensing element 28 of FIG. 5. The guide sensor 185 also receives an input from the handle position 173 to enable automatic operation.

The stanchion power control 179 receives its inputs from the guideway sensors 185, the proximity sensor 186, the hostler box 90, the grip 174, the handle position 173 of the three-position maneuvering handle (FIGS. 11-14) and the brake control 180. The power control 179 responds to these inputs to operate the pump and motor system 182 as described above.

The brake control 180 responds to the handle position and proximity sensor 186 (cat whisker 14 and proximity detector 13, FIG. 1, with sonic sensor) to (a) apply the semitrailer emergency brakes via trailer emergency hose 184 and (b) simultaneously to signal the power control unit 179 to turn the stanchion motor off. The latter signalling is a fail safe check of the power control 179 which should respond earlier to the handle in position 3 or the cat whisker sensing an obstruction.

The power control 179 also has an output operable in response to motor turn off to energize the locking clamp solenoid 71.

In the description which follows, the various control inputs are considered to have high voltages or B+ values when the corresponding switch is closed or the sensed condition is present. These control inputs are defined as follows:

| | |
|---|---|
| H1 | handle position 1 |
| H2 | handle position 2 |
| H3 | handle position 3 |
| GF | grip forward |
| GR | grip reverse |
| GB | guide bar present |
| GC | guide cable present |
| KEY | key present |
| KNOBF | knob forward |
| KNOBR | knob reverse |
| SS | sonic sensor |
| CW | cat whisker |

Figure 15:
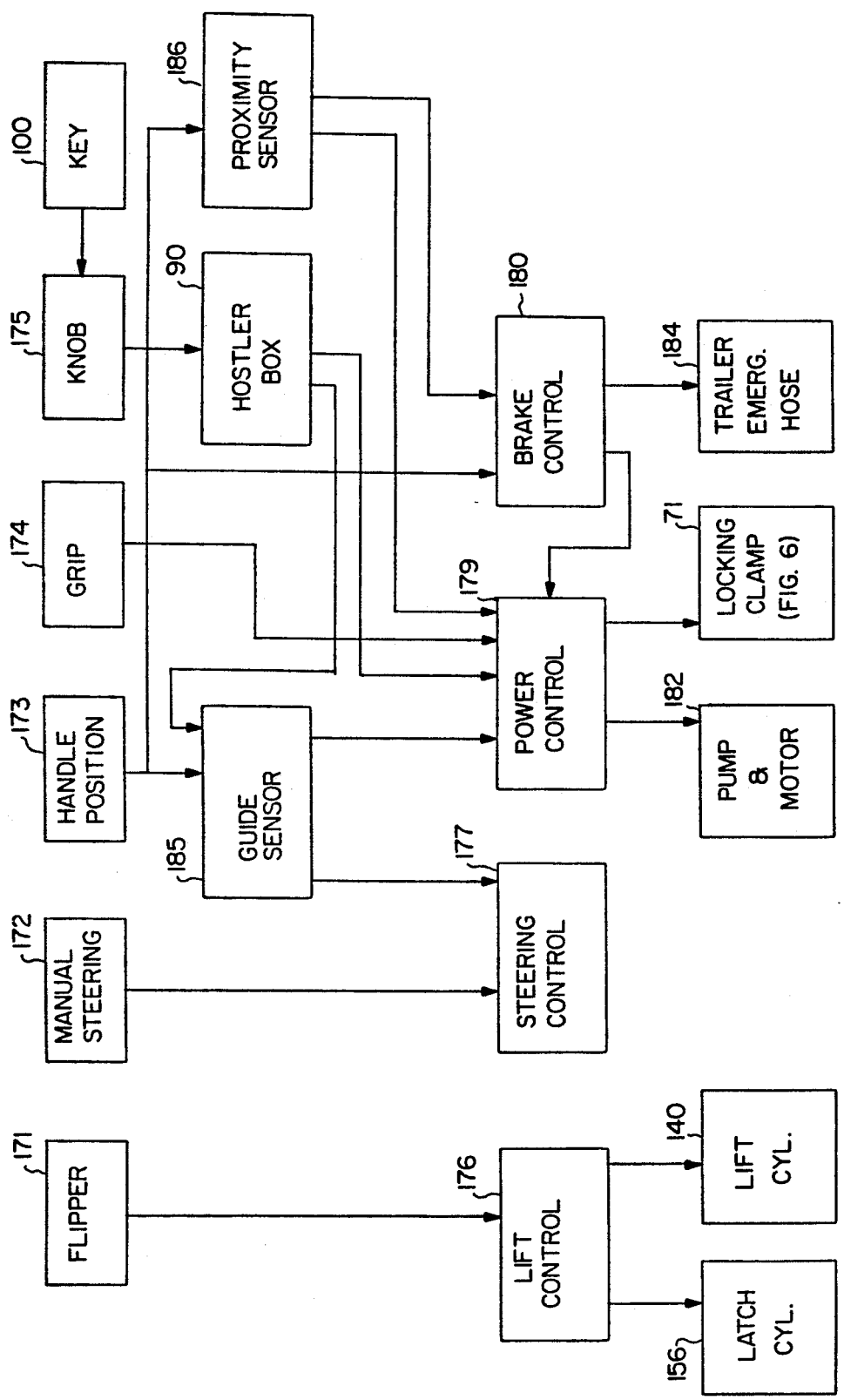
FIG. 15 is a block diagram showing the control signal flow for control of the stanchion motive means, steering means, lift control and brake control.

For manual operation, the handle is in the H1 position. As illustrated in FIG. 15, the manual steering 172 (lateral position of the handle 125) is operative to cause the steering control 177 to position the servo cylinder 181 and therefore the wheels of the stanchion vehicle. The forward or reverse position as selected by operation of the grip 174 is operative as an input to the power control 179. The logic of this control is illustrated in the logic diagram of FIG. 16. The logic diagrams of FIGS. 16-18 employ simple AND, OR and INVERTER gates for convenience only. Other types of gates such as NAND and NOR can be used.

Figure 16:
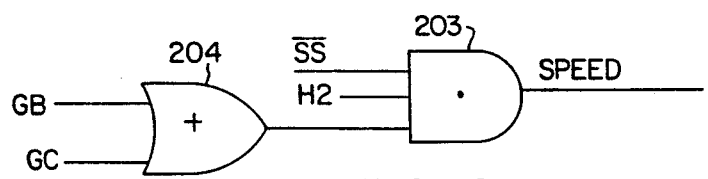
FIG. 16 is a logic diagram illustrating the logic that controls generation of the SPEED signal generated by the stanchion power control.

There is no logic in the FIG. 16 speed control for manual operation. Thus, the SPEED signal is low and the speed control valve is operative to move the propulsion pump to minimum displacement position corresponding to minimum speed.

Figure 17:
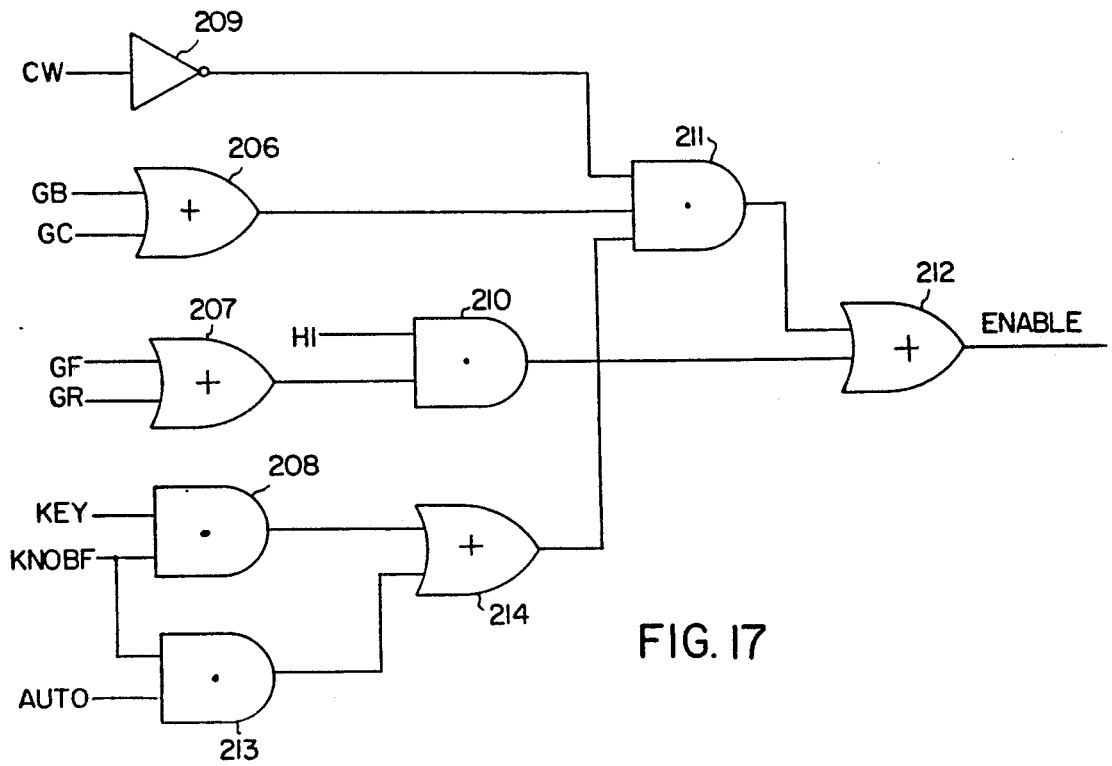
FIG. 17 is a logic diagram that illustrates generation of the ENABLE signal by the stanchion power control.

Manual operation does have control over the motion enable control valve. This logic is shown in FIG. 17 to include OR gates 207, 211 and 212 and AND gate 210. The GF and GR signals are combined in OR gate 207 to produce a grip present signal at one input to AND gate 210. The other input to AND gate 210 is the H1 handle position which is high and enables the AND gate at this time to pass the grip present signal via OR gates 211 and 212 to produce a high ENABLE signal.

Operator safety is assured for two reasons. First, only minimum speed is allowed for manual operation. Secondly, if the stanchion attempts to move faster than the operator, he will be forced to relinquish his hold on the grip which will cause the grip present signal to go low and, hence, the ENABLE signal to also go low. As discussed above in connection with FIG. 10, this causes the pump output to be shunted so as to shut down the motor.

For automatic operation, the handle is moved to position 2 and the key 100 must be inserted with the knob turned to the AUTO position. Steering control is shifted to the guideway sensors, either the guide bar or the guide cable. The motion enable logic in FIG. 17 for automatic operation includes OR gates 206, 214 and 212, inverter 209 and AND gates 208 and 211. The KEY and KNOB F signals enable AND gate 208 to produce a high level signal that is applied as one input to AND gate 211 via OR gate 214. The guide bar GB and guide cable GC signals are combined in OR gate 206 to produce a guideway as an input to AND gate 211. AND gate 211 is enabled if the cat whisker is in its normal non-contact position. That is, the CW signal is low if the cat whisker is not in contact with another object such as a trailer ahead. The low CW signal is inverted by inverter 209 to enable AND gate 211 to pass the guideway present signal via OR gate 212 as a high ENABLE signal so as to permit motion. Events which interrupt this motion are contact by the cat whisker with an obstruction, or loss of the GB or GC signal as when the stanchion leaves the guideway or turning the knob to another position.

Figure 18:
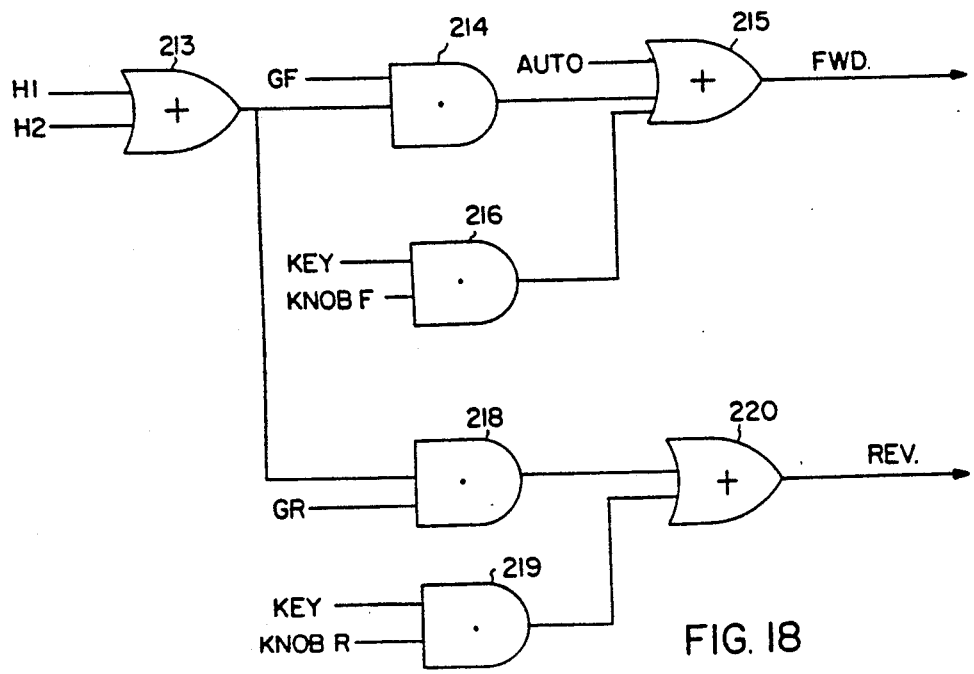
FIG. 18 is a logic diagram illustrating the generation of the forward and reverse signals by the stanchion power control.

The direction control logic for both the manual and automatic (handle 1 and handle 2 positions) is shown in FIG. 18 to include OR gates 213, 215 and 220 and AND gates 214 and 218. OR gate 213 combines the H1 and H2 signals to produce a handle 1 or handle 2 present signal so as to enable AND gates 214 and 218. The other signals to these two AND gates, the GF and GR signals, are complementary since the operator can press only grip forward or grip reverse but not both. Should grip forward be squeezed, the GF signal will be high and passed via AND gate 214 and OR gate 215 to produce a high level FWD signal. The GR signal of course will be low and the REV signal will also be low.

On the other hand, should the operator squeeze the reverse grip, the GR signal will be high. And gate 218 will pass the high GR signal via OR gate 220 to produce a high level REV signal. The GF signal will be low for this condition and so will the FWD signal.

The speed control logic for automatic or handle position 2 operation is illustrated in FIG. 16 to include an OR gate 204 and an AND gate 203. OR gate 204 combines the guide bar and guide cable present signals to produce a guideway present signal as one input to AND gate 203. The other inputs to AND gate 203 consist of the H2 handle position signal and the complement $\overline{SS}$ of the sonic sensor signal. Thus, with no obstruction being sensed by the sonic sensor, the $\overline{SS}$ signal will be high and with the handle in position 2, the H2 signal will be high and the AND gate 203 will be enabled to pass the guideway present signal so as to produce a high level SPEED signal. The high level SPEED signal will operate the speed control valve 182-3 to move the propulsion pump 182-2 to its maximum displacement position corresponding to maximum speed of the motor.

Should an obstruction come within the range of the sonic sensor, the $\overline{SS}$ signal will go low to disable the AND gate 203 causing the SPEED signal to go low. This will cause the speed control valve 182-3 to move the propulsion pump to the minimum displacement position corresponding to minimum speed. The stanchion will continue at minimum speed until the cat whisker switch encounters the obstruction and closes. This will disable the AND gate 211 in the motion enable control logic of FIG. 17 which in turn will cause the ENABLE signal to go low and disable the motor, thereby causing the stanchion to coast to a halt. If, prior to coming to a halt, the stanchion encounters the obstruction, the handle will by impact be moved to position 3. This results in immediate application of the semitrailer emergency brakes, thereby bringing both the stanchion and semitrailer to a halt.

Figure 19:
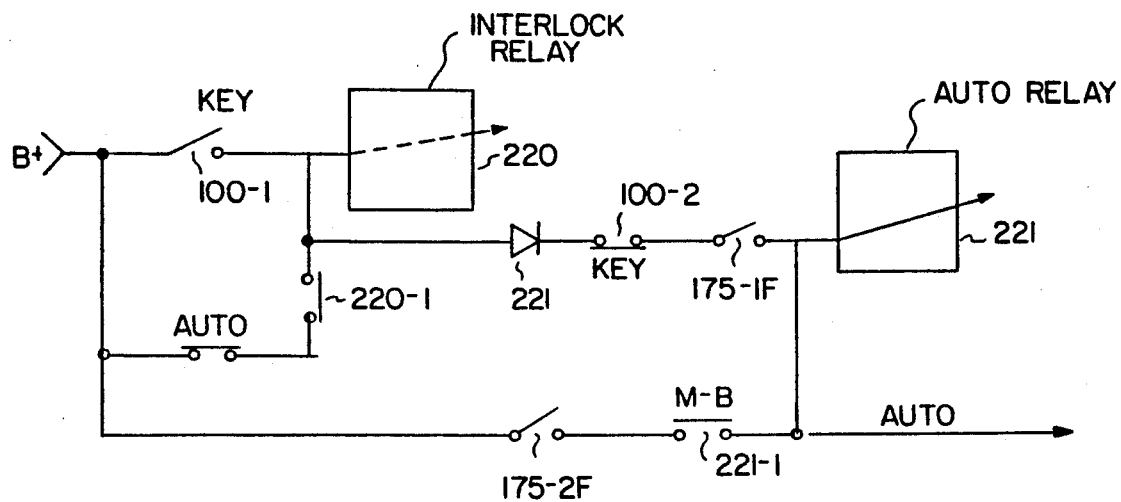
FIG. 19 is a block and schematic diagram illustrating an automatic control for operation of the stanchion upon removal of the key.

In a preferred mode of operation, once the key 100 has been inserted and the tractor started, the key may then be withdrawn and the control knob 175 turned to the FWD position. This will be interpreted as setting the stanchion into automatic motion, i.e., unattended motion. This is implemented with an interlock and auto relay as illustrated in FIG. 19. When the key is inserted initially, the key contacts 100-1 are closed and the key contacts 100-2 are opened. This results in energization of the interlock relay 220 which picks up its own stick contacts 220-1 so as to couple B+ to the left hand contact of the key contacts 100-2. Subsequent removal of the key will again close the contacts 100-2. The interlock relay will remain energized over its own stick contacts so as to continue to couple B+ via switch contacts 100-2 to the knob contacts 175-1F corresponding to the forward position of the knob 175 (see FIG. 14). When the knob is next turned to the forward position, the circuit to the auto relay will be completed so as to energize the auto relay coil. Since the auto relay contacts are make before break, the auto relay stick contacts pick up to keep this coil energized and then break the circuit to the interlock relay to drop its stick contacts 220-1 and remove power from the knob forward and key switches. The auto relay remains picked up via the now closed knob forward contacts 175-2F and its own stick contacts 221-1. In addition, this provides the high level AUTO signal which is employed in the enable and direction control logic of FIGS. 17 and 18. This AUTO signal will remain at a high level until such time as the knob 175 is returned to neutral which breaks the stick contact circuit to the auto relay 221.

Thus, forward motion in automatic mode (handle position 2) is permitted for one operation only upon removal of the key. If, for example, after the auto relay 221 has been picked up, the knob is returned to neutral, the knob contacts 175-2F will open so as to de-energize the auto relay. When the knob is subsequently turned back to the forward position without insertion of the key, no power will be applied to the auto relay coil because of the open stick contacts 220-1 and 221-1. This is important to prevent unauthorized starting of the stanchion vehicles and permit control thereof by controlling the individuals who are given hostler keys.

In the FIG. 17 ENABLE logic, the unattended motion feature is implemented by means of AND gates 211 and 213 and OR gates 212 and 214 operating in conjunction with OR gate 205 and inverter 209. The KNOB and AUTO signals are combined in AND gate 213 to assure that the output of OR gate 214 will be high upon removal of the key.

The output of OR gate 214 then serves to enable AND gate 211 to pass the GB or GC signal, as the case may be, from OR gate 206 onto OR gate 212 to produce the ENABLE signal as is described above for automatic operations. The AUTO signal is also employed in the direction control logic of FIG. 17 as an input to OR gate 215 to assure that the FWD signal will be high so long as the AUTO signal is high.

Figure 20:
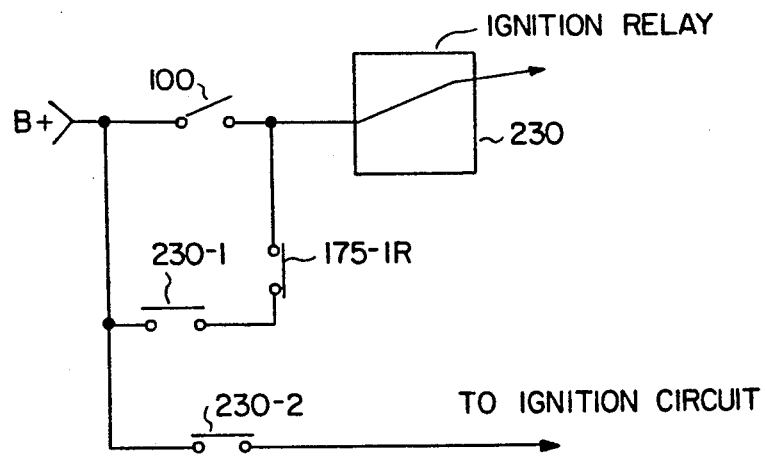
FIG. 20 is a schematic and block diagram illustrating an ignition control for use with the power driven stanchion.

FIG. 20 illustrates an ignition control circuit appropriate for use with the stanchion control mechanism described above. This circuit includes the key switch 100, a normally closed contact 175-1R on the reverse position of the knob and an ignition relay 230. When the key is inserted, B+ is applied to the ignition relay picking up its stick contact 230-1 over the normally closed reverse contact 175-1R of the knob so as to maintain the ignition relay energized even when the key is removed. The energized ignition relay also closes the contacts 230-2 which allows B+ to be applied to the ignition coil so as to permit the engine to be started and run. To turn the engine off with the key removed, the operator merely turns the knob 175 (FIG. 14) to the shutdown position. This causes the contact 175-1R of the reverse position of the knob to open and thereby de-energize the ignition relay 230. This causes the contacts 230-1 and 230-2 to open, thereby interrupting the flow of current from B+ to the ignition circuit. This same circuit line is connected to the clamp solenoid 71 (FIG. 6) such that the absence of the ignition circuit signal will cause the solenoid to de-energize and allow the spring 72 to cause the clamp to retract and engage the flanges 20 (FIG. 6).

Returning once again to FIGS. 11–14, the operation of the flipper will now be described. Movement of the flipper 171 to the up position will operate the lift control 176 so as to operate the lift actuator 140 via port connection 159 (FIG. 9). As described in connection with FIG. 9, the lift cylinder 140 is latched in its fully-extended position by the latch cylinder 156. When the flipper is moved to the neutral position the fluid supply to the lift cylinder will be blocked and the latch cylinder will be permitted to relax and allow the latch to lock the actuator in its full up position. If the latch does not drop into its lock (as would be the case when the lift activator was in other than "fully raised" position) this will be monitored and an alarm actuated to remind the operator not to leave the stanchion in this condition. This is necessary because, while sealing the fluid supply will prevent the cylinder from collapsing and dropping the trailer to its landing gear, fluid leakage due to defects could do this over disc, and thus upset the proper tie down of the trailer to the deck of the train. When the flipper is moved to the down position, the lift control 174 is operable to supply hydraulic pressure via port connection 160 (FIG. 9) to operate the latch cylinder to release the lift cylinder from its fully-extended or elevated position. The lift control 174 contemporaneously vents hydraulic pressure via port 159 from the lift cylinder 140 so as to allow the lift cylinder to move to its retracted position. When the flipper is in the neutral position, the fifth wheel is maintained in its up or down position, as the case may be.

A modified form of the present invention would be to electrify the operation of the power driven stanchions 12 instead of using gasoline motors, as is disclosed in my prior U.S. application Ser. No. 853,561, filed Apr. 18, 1986 and provide for either battery operated motors or for a power line to be run throughout the guiderail 16, or a similar rail along the deck of the flat cars 10, to be connected with the train's power supply to permit battery charging during the train journey so as to assure no failure in loading or unloading at the end of the journey.

It is further submitted that the guideway 21 within the terminal 22 is not necessarily limited to following a rail or a conductor to various destinations in the terminal, and that a system may be used such as is disclosed in the Stephens U.S. Pat. No. 4,647,784 granted Mar. 3, 1987, which discloses a vehicle guidance and control system having a number of trucks whose movement is controlled by a base station. Each truck periodically fixes its own position in relation to marker boards consisting of patterns of reflective coded stripes by scanning a narrow laser beam in a predetermined direction across the stripes. Using at least two marker boards along a desired guidance path, the position of each vehicle can be determined by triangulation, while accuracy can not be determined by a particular stripe on the board. Thus by strategic location of the marker boards, a guide path can be set up without the use of a conductor embedded in the ground to be followed.

Without relying on use of the cat whisker wire 14 on the power stanchions 12 for a proximity detector, any one of several electrical proximity detector systems known in the prior art can be used, such, for example, as the detector disclosed in the Frushour, et al, U.S. Pat. No. 4,644,237, granted Feb. 17, 1987. This system discloses an electronic sensing means to avoid collision, for example, of two arms of a robot which are prevented from being driven within a predetermined distance of each other by a separation sensor which generates a signal when separation of the arms is a first determined distance, and second signal when the separation is a second predetermined distance smaller than the first, and a stop signal when separation is a third predetermined distance smaller than the second.

Having thus described a method and apparatus for loading and unloading a train of flat cars with semitrailers as a preferred embodiment of the present invention, together with modified methods and apparatus, it is to be understood that various other modifications and alterations may be made to the specific embodiments described without departing from the spirit of the present invention.

What is claimed is:

1. The method of loading and unloading a train of flat cars having decks with a plurality of semitrailers having fifth wheel couplings by operation of power stanchions comprising the steps of:
   (a) coupling the stanchions to individual ones of the semitrailers,
   (b) moving the stanchion coupled semitrailers along a guideway disposed partly in a terminal yard and partly in a path extending along the decks of the flat cars longitudinally of the train by an onboard stanchion guidance means that coacts with the guideway such that inbound semitrailers aboard the train are unloaded and that outbound trailers are loaded from the yard onto the train along such longitudinal path over a plurality of such cars; and
   (c) sensing the close proximity of a stanchion to a semitrailer ahead along the guideway, and bringing the stanchion and associated semitrailer to a halt upon a sense of close proximity to such semitrailer ahead.

2. The method of loading and unloading a train of flat cars with semitrailers according to claim 1 comprising a further step, responsive to deactivation of the stanchions, of locking the stanchions to the flat cars.

3. The method of loading and unloading a train of flat cars with semitrailers according to claim 2 comprising a further step, responsive to deactivation of the stanchions, of releasing fluid pressure from spring applied brakes of the associated semitrailers for causing the brakes to be applied.

4. The method of loading and unloading a train of flat cars with semitrailers according to claim 1 comprising an additional step of unloading semitrailers from one end of the railway flat cars contemporaneously with the loading of semitrailers from the opposite end of the flat cars.

5. The method of loading and unloading a train of flat cars with a plurality of semitrailers according to claim 1 wherein the moving step involves a like plurality of the stanchions each coupled to a different semitrailer and arranged to simultaneously follow the guideway in a single file between the yard and the train.

6. The method of loading and unloading a train of flat cars with a plurality of semitrailers according to claim 5 comprising an additional step of unloading semitrailers from one end of the railway flat cars contemporaneously with the loading of semitrailers from the opposite end of the flat cars.

7. The method of loading a train of flat cars having decks with a plurality of semitrailers having fifth wheel couplings by operation of power stanchions comprising the steps of:

(a) coupling the stanchions to the fifth wheel couplings of individual ones of the semitrailers;
(b) loading the stanchion coupled semitrailers aboard the train by
  (i) moving the stanchion coupled semitrailers along a guideway disposed partly in a terminal yard and partly in a path extending along the decks of the flat cars longitudinally of the train by an onboard stanchion guidance means that coacts with the guideway such that the stanchion coupled trailers are loaded from the yard onto the train along such longitudinal path over a plurality of such cars;
  (ii) parking the stanchion coupled semitrailers to separate parking locations along such decks where one or more parking locations span the ends of adjacent cars;
  (iii) locking each stanchion to the deck at its respective parking location; and
(c) unloading the stanchion coupled semitrailers from the train by
  (i) disengaging the stanchions from the car decks; and
  (ii) moving the stanchion coupled semitrailers along the guideway off the train and into the yard by the onboard stanchion guidance means.

8. The method of loading and unloading a train of flat cars with a plurality of semitrailers according to claim 7:
wherein the loading and the unloading steps each involve the stanchion coupled semitrailers being arranged to simultaneously follow the guideway in a single file between the yard and the train.

* * * * *